(12) United States Patent
Kondo et al.

(10) Patent No.: US 6,807,870 B2
(45) Date of Patent: Oct. 26, 2004

(54) ROTARY SHAFT AXIAL ELONGATION MEASURING METHOD AND DEVICE

(75) Inventors: Mitsuru Kondo, Takasago (JP); Kazuharu Hirokawa, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/928,449

(22) Filed: Aug. 14, 2001

(65) Prior Publication Data

US 2002/0033052 A1 Mar. 21, 2002

(30) Foreign Application Priority Data

Sep. 18, 2000 (JP) .......................... 2000-281826

(51) Int. Cl.$^7$ .............................. G01L 3/14; A45B 3/08
(52) U.S. Cl. .............................. 73/862.324; 73/862.32; 73/5; 33/706
(58) Field of Search ...................... 73/800, 862.324, 73/862.325; 33/706

(56) References Cited

U.S. PATENT DOCUMENTS

| | | | |
|---|---|---|---|
| 4,112,746 A | * 9/1978 | Itoh et al. ...................... | 73/789 |
| 4,166,383 A | * 9/1979 | Lapeyre .................. | 73/862.324 |
| 4,712,432 A | * 12/1987 | Hochstein et al. ..... | 73/862.334 |
| 5,315,881 A | * 5/1994 | Savage et al. ......... | 73/862.333 |
| 5,438,882 A | * 8/1995 | Karim-Panahi et al. ...................... | 73/862.324 |
| 5,723,794 A | * 3/1998 | Discenzo ..................... | 73/800 |

FOREIGN PATENT DOCUMENTS

| | | | |
|---|---|---|---|
| DE | 3908248 | 9/1990 | |
| DE | 19609320 | 9/1997 | |
| JP | 61-181904 | 8/1986 | |
| JP | 63313007 A | * 12/1988 | ........... G01B/21/00 |
| JP | 5-133201 | 5/1993 | |

OTHER PUBLICATIONS

Patent Abstracts of Japan, vol. 013, No. 152 (P–856), Apr. 13, 1989 & JP 63 313007 A (Natl Aerospace Lab), Dec. 21, 1988.
Patent Abstracts of Japan, vol. 008, No. 101 (P–273), May 12, 1984 & JP 59 013906 A (Mitsui Toatsu Kagaku KK), Jan. 24, 1984.
Patent Abstracts of Japan, vol. 011, No. 230 (P–599), Jul. 28, 1987 & JP 62 044603 A (S G:KK), Feb. 26, 1987.

* cited by examiner

*Primary Examiner*—Edward Lefkowitz
*Assistant Examiner*—Lilybett Martir
(74) *Attorney, Agent, or Firm*—Wenderoth, Lind & Ponack, L.L.P.

(57) ABSTRACT

A rotary shaft axial elongation measuring method and device enable accurate measuring of rotary shaft axial elongation regardless of the amount of the elongation. Grooves (10, 12), arranged opposite to each other in a turned V shape along the axial direction, are provided in a rotational surface of the rotary shaft (1) whose axial elongation is to be measured. A sensor (14) is arranged opposite the rotational surface of the rotary shaft (1). The sensor (14) generates pulses upon passing of the groves (10, 12) following rotation of the rotary shaft (1). As a circumferential interval between the grooves (10, 12) differs according to the axial directional position of the rotary shaft (1), if the positions of the grooves (10, 12) at the position of the sensor (14) change due to the axial elongation, the interval of the pulses generated by the sensor (14) changes. Thus, by the change in the pulse generation interval, the axial elongation is measured.

13 Claims, 5 Drawing Sheets

Axial elongation measuring range

ROTARY SHAFT AXIAL ELONGATION MEASURING METHOD AND DEVICE

BACKGROUND OF THE INVENTION

1. Field of the Invention

The present invention relates to an axial elongation measuring method and device for a rotary shaft, such as a gas turbine or steam turbine rotor shaft, that elongates in the axial direction.

2. Description of the Prior Art

Because a rotor shaft of a gas turbine or steam turbine undergoes axial elongation according to temperature changes, it is necessary to accurately monitor whether or not the elongation is within a predetermined range so that no mutual contact of a moving blade and a stationary blade may be caused. One example of the prior art used to measure the axial elongation of a rotary shaft is to use a gap sensor to detect a gap caused by the axial elongation, as shown in FIG. 7.

In FIG. 7, numeral 1 designates a rotary shaft, and this rotary shaft 1 is provided with a target face 2 for measuring the axial elongation. A gap sensor 4 is arranged so as to oppose the target face 2. The gap sensor 4 is fitted to a stationary part 6. The gap sensor 4 measures a gap 8 between the target face 2 and the sensor 4. By the change of this gap 8, the axial elongation of the rotary shaft 1 is measured.

In the prior art axial elongation measuring device as mentioned above, the elongation of the rotary shaft 1 is directly measured by the gap sensor 4 relative to the stationary part 6. Therefore, in case the axial elongation of the rotary shaft 1 is large, it is necessary to measure the gap 8 over a wide range. However, measuring the gap 8 with the gap sensor 4 over the wide range often results in less accuracy.

Also, as the gap sensor 4 is provided in the axial directional space around the rotary shaft 1 where the gap 8 to be measured exists, a certain space is required in the axial direction of the rotary shaft 1 for installing the gap sensor 4.

SUMMARY OF THE INVENTION

In view of the above-mentioned problems in the prior art rotary shaft axial elongation measuring device, it is an object of the present invention to provide a rotary shaft axial elongation measuring method and a device therefor that are free from such problems as mentioned above and are able to measure axial elongation of a rotary shaft with high accuracy regardless of the amount of axial elongation.

According to the present invention, a rotary shaft axial elongation measuring method for measuring axial elongation of a rotary shaft comprises providing a reference mark and a measuring mark on a rotational surface of the rotary shaft. The measuring mark is inclined relative to an axial direction of the rotary shaft. A sensor is fixed so as to oppose the rotational surface of the rotary shaft, the sensor generating pulses upon the passing of the marks during a rotation of the rotary shaft. The axial elongation of the rotary shaft is measured from a change in an interval of the pulses generated by the sensor upon passing of the reference mark and measuring mark.

According to the axial elongation measuring method of the present invention, as the measuring mark is inclined relative to the axial direction of the rotary shaft, the circumferential directional position of the measuring mark line relative to the position of the reference mark changes according to the axial directional position thereof On the other hand, the sensor generates pulses when the reference mark and the measuring mark pass by the sensor, following the rotation of the rotary shaft, and hence if the axial directional position of the rotary shaft opposing the sensor changes due to the axial elongation of the rotary shaft, then the interval of the pulses generated by the sensor differs. Consequently, by measuring the change in the interval of the pulses generated by the sensor, the axial elongation of the rotary shaft can be measured.

In the axial elongation measuring method of the present invention, the steps are simplified such that the reference mark, and the measuring mark inclined relative to the axial direction of the rotary shaft, are provided on the rotational surface of the rotary shaft, the axial elongation of which is to be measured. The sensor is fixed so as to oppose the rotational surface of the rotary shaft for generating pulses upon the passing of the marks which follow the rotation of the rotary shaft. Hence the gap between the sensor and the rotational surface of the rotary shaft opposing the sensor does not change substantially due to the axial elongation of the rotary shaft, and the accuracy of measuring the axial elongation with the sensor is in no way reduced by the amount of axial elongation. Also, according to the method of the present invention there is no need to install a sensor and a target face, as in the prior art case, in the axial directional space around the rotary shaft, and thus no case occurs where measurement becomes impossible due to limitations in the axial directional space of the rotary shaft.

The present invention further provides a rotary shaft axial elongation measuring device for measuring axial elongation of a rotary shaft. A reference mark and a measuring mark are provided on a rotational surface of the rotary shaft. The measuring mark is inclined relative to an axial direction of the rotary shaft. A sensor is fixed so as to oppose the rotational surface of the rotary shaft, the sensor generating pulses upon the passing of the marks during rotation of the rotary shaft. A data processing part measures the axial elongation of the rotary shaft from a change in an interval of the pulses generated by the sensor upon the passing of the reference mark and measuring mark.

According to the rotary shaft axial elongation measuring device of the present invention, a device is provided that is able to measure the axial elongation of the rotary shaft based on the axial elongation measuring method of the present invention as mentioned above.

In the axial elongation measuring device of the present invention, because the axial elongation data is obtained by a fixed sensor opposing the rotational surface of the rotary shaft, the gap between the sensor and the rotational surface is constant, regardless of the amount of axial elongation of the rotary shaft. Thus measurement of the axial elongation with high accuracy can be performed.

Also, in the axial elongation measuring device of the present invention, as the sensor may be arranged with a predetermined gap being maintained between itself and the rotational surface of the rotary shaft, only a narrow space is required for measuring the axial elongation, regardless of the amount of axial elongation.

The reference mark and the measuring mark provided on the rotational surface of the rotary shaft in the axial elongation measuring device of the present invention may be two marks provided such that an interval between them in the circumferential direction of the rotary shaft differs according to the axial directional position of the rotary shaft. These two marks may be two grooves or two wire members both provided in a turned V shape.

Also, the measuring mark used in the axial elongation measuring device of the present invention may be a groove or a wire member both provided in a spiral shape on the rotational surface of the rotary shaft.

As mentioned above, the axial elongation measuring device of the present invention may be of a simple construction that is made easily and is less costly.

The sensor used in the axial elongation measuring method and device of the present invention may be an ordinary gap sensor, such as a capacitance type gap sensor or eddy current gap sensor, or may be a photoelectric sensor that generates a pulse signal upon the passing of a mark provided on the rotational surface.

According to the present invention as described above, even in the case where the rotary shaft affords no space for measuring with the conventional art, thereby making the measurement of the axial elongation impossible with the conventional art, a measuring device that can be easily installed for enabling the measurement of the axial elongation is provided.

BRIEF DESCRIPTION OF THE DRAWINGS

FIGS. 1(a) and 1(b) show a rotary shaft used in a first embodiment according to the present invention, wherein FIG. 1(a) is a side view and FIG. 1(b) is a front view.

DESCRIPTION OF THE PREFERRED EMBODIMENTS

Herebelow, a rotary shaft axial elongation measuring device of the present invention will be concretely described based on embodiments as illustrated.

First Embodiment

Figure 1A:
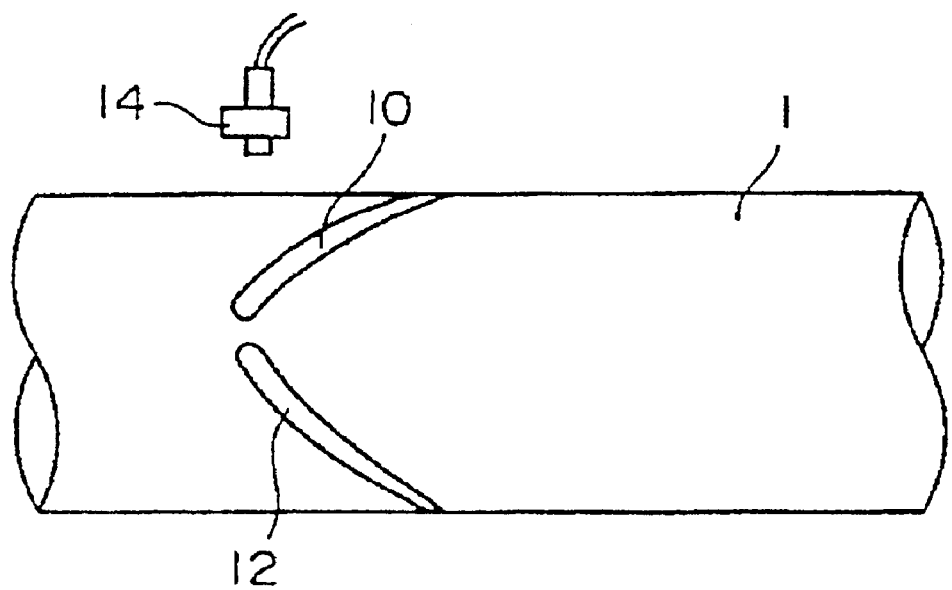
Figure 1B:
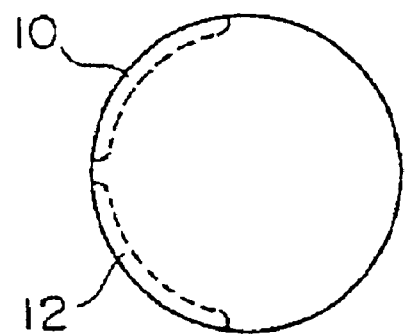

A first embodiment according to the present invention will be described with reference to FIGS. 1 to 4. In FIGS. 1(a) and 1(b), numerals 10 and 12, respectively, designate grooves that are provided in a rotational outer circumferential surface of a rotary shaft 1 so as to oppose one another at an incline and which form a turned V shape. Thus, the grooves 10 and 12, opposing one another, extend at an incline relative to an axial direction of the rotary shaft 1. An interval between the grooves 10 and 12 changes according to the axial directional position thereof such that one of the grooves 10, 12 constitutes a reference mark as hereinafter referred to and the other constitutes a measuring mark as hereinafter referred to.

Numeral 14 designates a sensor that is arranged so as to oppose the rotational outer circumferential surface of the rotary shaft 1. This sensor 14 may be a sensor, such as a capacitance type gap sensor, eddy current gap sensor or photoelectric sensor, that generates a pulse or pulse signal according to a change in a capacitance, eddy current or reflection of light following a change in a gap between the sensor 14 and the rotational outer circumferential surface of the rotary shaft 1 when the grooves 10 and 12 pass by the sensor 14 by the rotation of the rotary shaft 1.

Figure 2A:
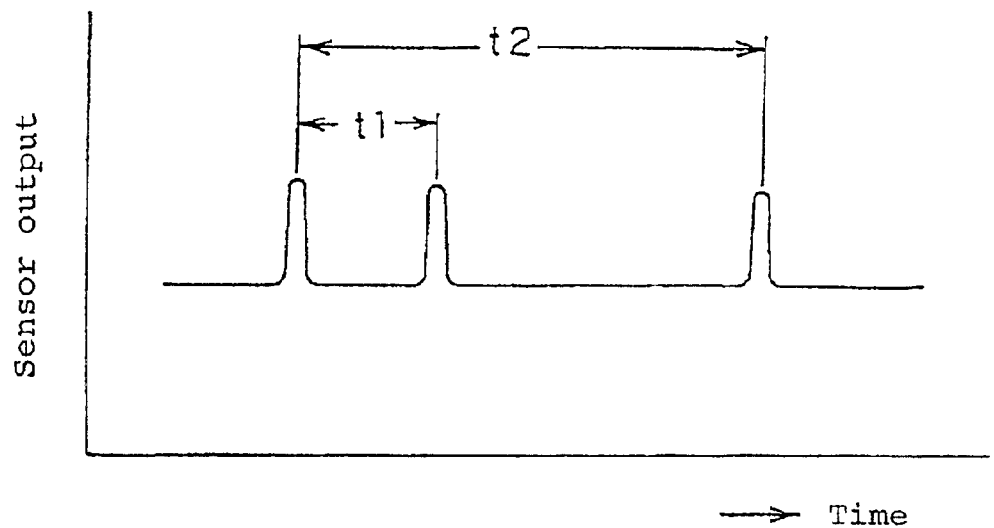
FIGS. 2(a) and 2(b) are explanatory views showing the state where pulses generated by a sensor upon rotation of the rotary shaft of FIGS. 1(a) and 1(b) change from FIG. 2(a) to FIG. 2(b) due to axial elongation.
Figure 2B:
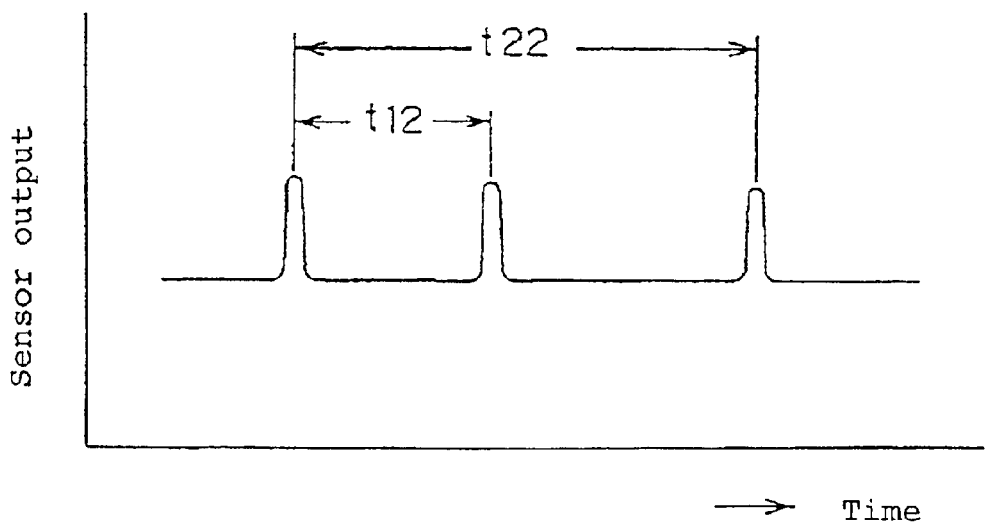

In the measuring device of FIGS. 1(a) and 1(b) constructed as above, if the rotary shaft 1 rotates, the grooves 10 and 12 pass by the sensor 14. The sensor 14 puts out pulses, as shown in FIGS. 2(a) and 2(b), corresponding to a time t1, which is a time from when the groove 10 passes by the sensor 14 until the groove 12 does so, and a time t2, which is the time of one rotation of the rotary shaft 1.

As the position of the sensor 14 is fixed, if the rotary shaft 1 elongates in the axial direction and the axial directional position of the grooves 10 and 12 changes, then the circumferential directional interval between the grooves 10 and 12 at the position of the sensor 14 changes. Hence, due to the axial elongation of the rotary shaft 1, the pulses generated by the sensor 14 change as shown in FIG. 2(b), so that the pulses change from those having a pulse interval ratio of t1/t2 in FIG. 2(a) to those having a different pulse interval ratio of t12/t22 in FIG. 2(b).

Thus, by measuring the change in the pulse interval ratio t1/t2 obtained by the sensor 14, the axial elongation of the rotary shaft 1 can be measured.

Figure 3:
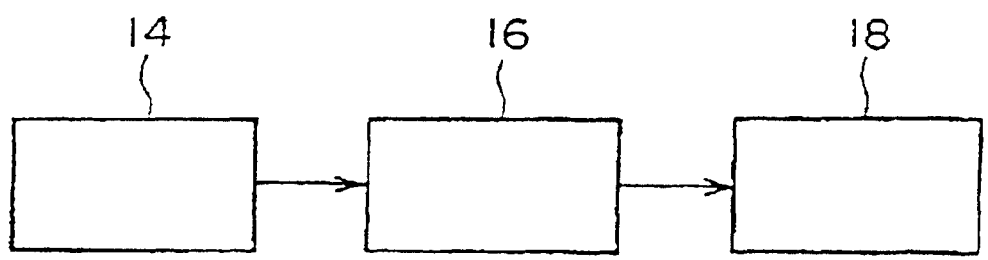
FIG. 3 is a block diagram showing an entire construction of an axial elongation measuring device of the first embodiment according to the present invention.

FIG. 3 is a block diagram showing an entire construction of the axial elongation measuring device. The pulse interval ratio of the pulses detected by the sensor 14 is sent to a data processing part 16 and the axial elongation obtained at the data processing part 16 is displayed at a display part 18.

The grooves 10 and 12 of the rotary shaft 1 may be provided in the outer circumferential surface of the rotary shaft 1 within the range of ½ or less of the entire outer circumference as shown in FIG. 1(b). Then, if the ratio t1/t2 is more than 0.5 (t1/t2>0.5), the axial elongation and the ratio t1/t2 can be decided correspondingly as (1−t1/t2) and the data processing can thereby be simplified.

Figure 4:
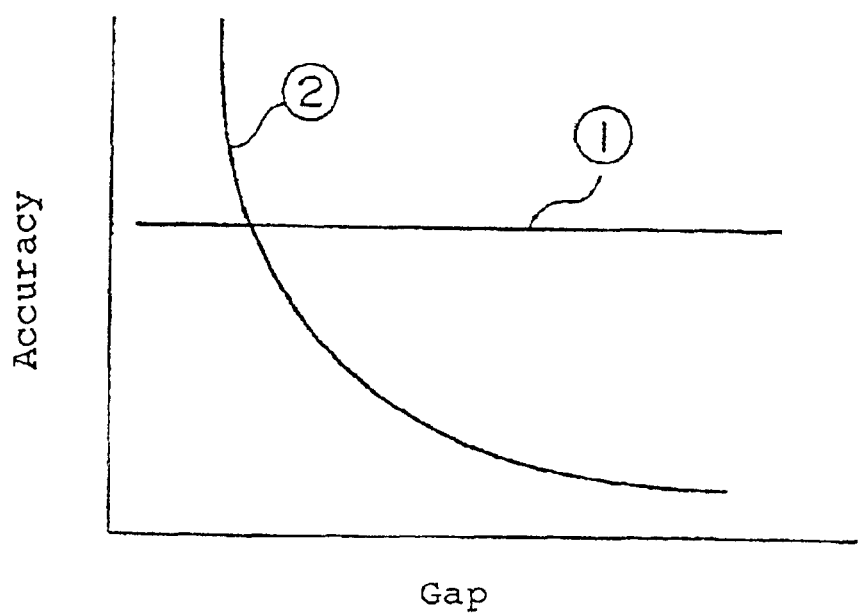
FIG. 4 is an explanatory view showing the relation between accuracy of axial elongation measurement with the present invention and that with the prior art.
Figure 7:
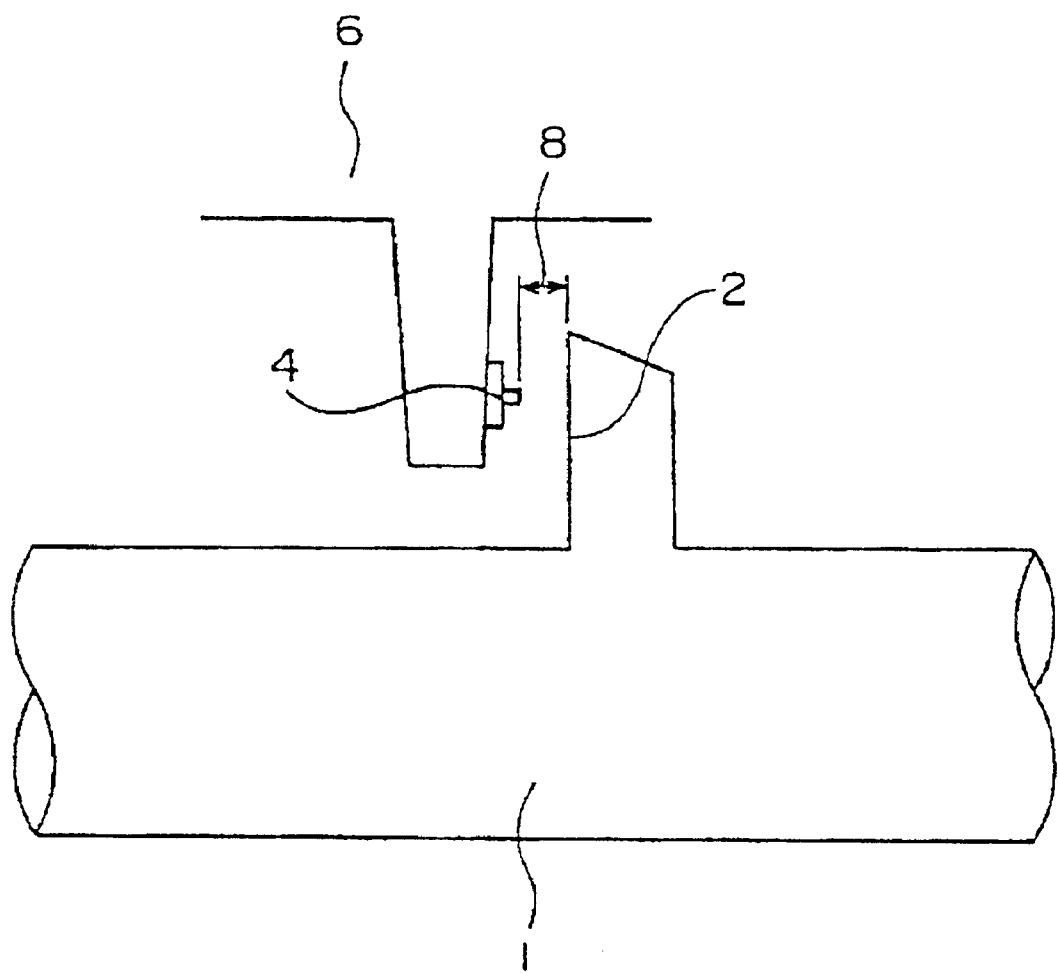
FIG. 7 is a side view showing a construction of a prior art axial elongation measuring device.

With the means to measure the interval changes of the marks provided in the rotational outer circumferential surface of the rotary shaft 1 by the sensor 14, arranged oppositely to this rotational surface as described above, because the gap between the sensor 14 and the rotational surface, as the object to be measured, is constant regardless of the axial elongation, the measuring accuracy can be maintained constant. This is shown by FIG. 4, wherein 1̂ shows the accuracy of the present invention and 2̂ shows the state where the measuring accuracy becomes lower as the gap between the sensor and the object to be measured becomes larger due to the axial elongation as with the case shown in FIG. 7.

Second Embodiment

Figure 5:
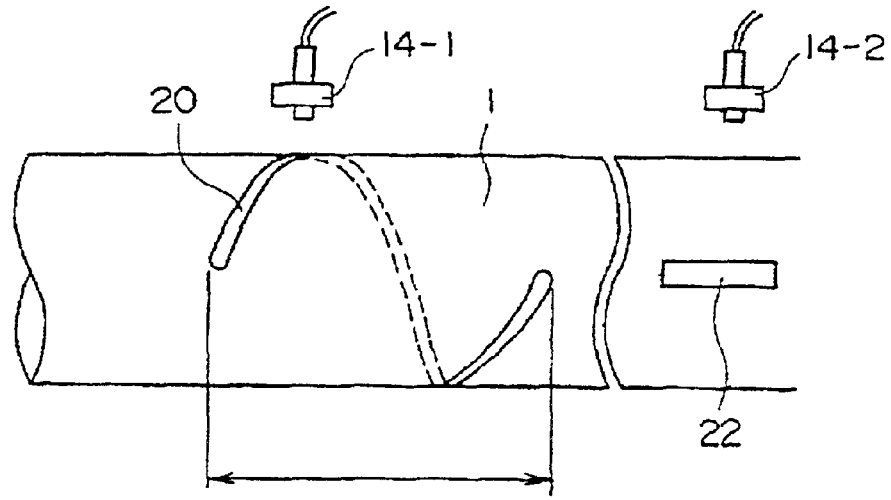
FIG. 5 is a side view showing a rotary shaft used in a second embodiment according to the present invention.
Figure 6:
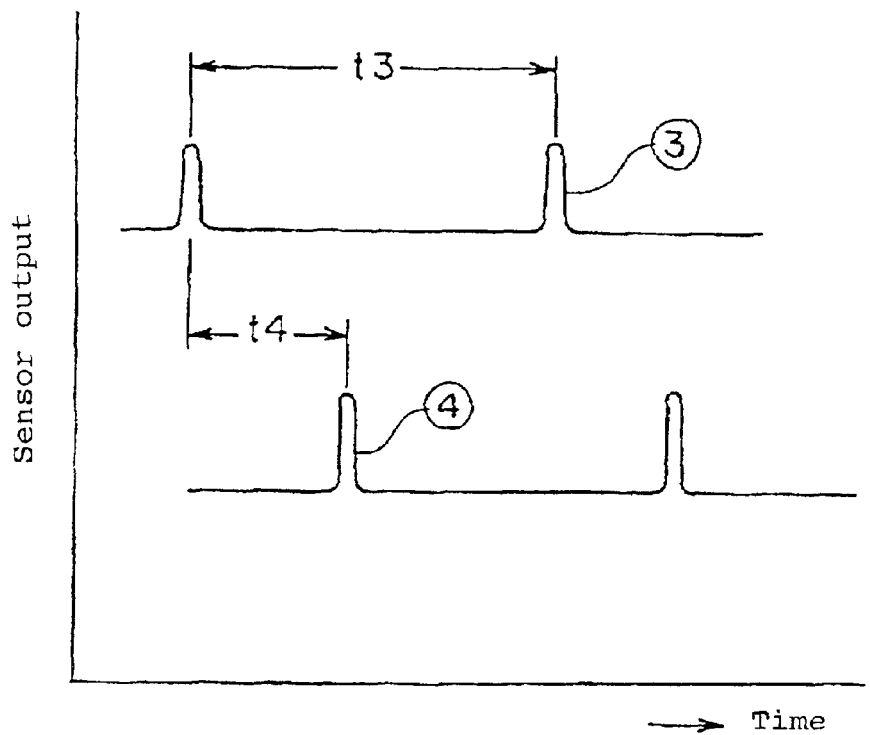
FIG. 6 is an explanatory view showing changes caused by axial elongation in pulses generated by a sensor upon rotation of the rotary shaft of FIG. 5.

A second embodiment according to the present invention will be described with reference to FIGS. 5 and 6. In FIG. 5, numeral 20 designates a spiral groove that is provided in the rotational outer circumferential surface of the rotary shaft 1 over the axial elongation measuring range as shown. Numeral 22 designates a groove that constitutes a reference mark and is provided extending in the axial direction in the rotational outer circumferential surface of the rotary shaft 1. A sensor 14-1 is arranged so as to oppose the rotational surface of the rotary shaft 1 at the position where the spiral groove 20 is provided and another sensor 14-2 is arranged so as to oppose the rotational surface of the rotary shaft 1 at the position where the groove 22, as the reference mark, is provided.

In the measuring device of FIG. 5 described above, if the rotary shaft 1 rotates and the grooves 20 and 22 pass by the sensors 14-1 and 14-2, respectively, then the sensors 14-1 and 14-2 put out respective pulses. FIG. 6 shows the state of the pulses generated. $\hat{3}$ shows the pulses generated by the sensor 14-2 corresponding to the rotational movement of the groove 22 as the reference mark of the rotary shaft 1. Time t3 is the time of one rotation of the rotary shaft 1. On the other hand, $\hat{4}$ of FIG. 6 shows the pulses generated by the sensor 14-1 when the spiral groove 20 passes by the sensor 14-1 and one of the pulses is generated per rotation of the rotary shaft 1.

As the spiral groove 20 is arranged in a spiral form, it changes its position where it passes by the sensor 14-1 in correspondence with the axial elongation of the rotary shaft 1. Time t4 of FIG. 6 is a time difference between the pulses $\hat{3}$ and $\hat{4}$ and changes corresponding to the axial elongation. Consequently, by measuring the change in the ratio t4/t3, the axial elongation of the rotary shaft 1 can be obtained, as in the case of the first embodiment.

It is to be noted that, while the present invention has been concretely described based on the embodiments as illustrated, the present invention is not limited to these embodiments but, needless to mention, may be added to with various modifications in the concrete structure and construction thereof as come within the scope of the appended claims.

For example, while in the above embodiments the grooves are formed as the reference mark and the measuring mark provided on the rotational surface of the rotary shaft 1, a wire member, such as a wire made of aluminum or stainless steel, may be fitted instead, as a mark, by spot welding or the like so as to form a projection on the rotational surface.

Also, while in the first embodiment the two marks are arranged to oppose one another at an incline in the turned V shape, the arrangement may be made such that one of the marks is arranged parallel with the axis of the rotary shaft 1 and the other is inclined relative to the axial directed so that formation of the marks may be facilitated.

What is claimed is:

1. A method of measuring axial elongation of a rotary shaft, comprising:

providing two marks on a rotational surface of a rotary shaft such that the marks are oppositely inclined to one another so as to form a V shape turned relative to an axial direction of the rotary shaft so that a circumferential direction interval between the marks changes according to the axial direction position along the rotary shaft;

providing a sensor opposite to the marks on the rotational surface of the rotary shaft, the sensor being operable to generate pulses when the marks pass the sensor during rotation of the rotary shaft; and measuring the axial elongation of the rotary shaft from a change in an interval ratio of the pulses generated by the sensor when the marks pass the sensor during rotation of the rotary shaft.

2. The method of claim 1, wherein the marks comprise a reference mark and a measuring mark, and wherein the interval ratio of the pulses is the ratio of the time from detection of the reference mark until detection of the measuring mark to the time it takes for one rotation of the rotary shaft as determined by the sensor.

3. The method of claim 1, wherein the sensor is fixed.

4. A rotary shaft axial elongation measuring device, comprising:

two marks provided on a rotational surface of a rotary shaft, wherein said marks are oppositely inclined to one another relative to an axial direction of the rotary shaft such that a circumferential direction interval between the marks change according to the axial direction position along the rotary shaft;

a sensor positioned opposite to the marks on the rotational surface of said rotary shaft, said sensor being operable to generate pulses when said marks pass said sensor during rotation of the rotary shaft; and a data processing part operable to determine axial elongation of the rotary shaft from a change in an interval ratio of the pulses generated by said sensor when said marks pass said sensor during rotation of the rotary shaft.

5. The rotary shaft axial elongation measuring device of claim 4, wherein said plurality of marks comprises a reference mark and a measuring mark.

6. The rotary shaft axial elongation measuring device of claim 5, wherein said reference mark and said measuring mark comprise two grooves in the rotational surface provided so as to form a V shape.

7. The rotary shaft axial elongation measuring device of claim 6, wherein said sensor is any one of a capacitance type gap sensor, an eddy current gap sensor and a photoelectric sensor.

8. The rotary shaft axial elongation measuring device of claim 5, wherein said reference mark and said measuring mark comprise two wire members fitted on the rotational surface of the rotary shaft in a V shape.

9. The rotary shaft axial elongation measuring device of claim 8, wherein said sensor is any one of a capacitance type gap sensor, an eddy current gap sensor and a photoelectric sensor.

10. The rotary shaft axial elongation measuring device of claim 5, wherein said sensor is any one of a capacitance type gap sensor, an eddy current gap sensor and a photoelectric sensor.

11. The rotary shaft axial elongation measuring device of claim 4, wherein said sensor is any one of a capacitance type gap sensor, an eddy current gap sensor and a photoelectric sensor.

12. The rotary shaft axial elongation measuring device of claim 4, wherein said plurality of marks comprises a reference mark and a measuring mark, and wherein the interval ratio of the pulses is the ratio of the time from detection of the reference mark until detection of the measuring mark to the time it takes for one rotation of the rotary shaft as determined by said sensor.

13. The rotary shaft axial elongation measuring device of claim 4, wherein said sensor is fixed.

* * * * *